(12) United States Patent
Cullum et al.

(10) Patent No.: US 8,922,849 B2
(45) Date of Patent: Dec. 30, 2014

(54) DOCUMENT SCANNER

(75) Inventors: Andrew Roy Cullum, Dry Dayton (GB); Graham James Ohn Tinn, St. Ives (GB); Jianjun Zuo, Jiangsu (CN); Feng Li, Jiangsu (CN); Peng Jiang, Jiangsu (CN); David Badger, Yaxley (GB); Jun Wang, Jiangsu (CN)

(73) Assignee: Colortrac Limited, St. Ives, Huntingdon (GB)

( * ) Notice: Subject to any disclaimer, the term of this patent is extended or adjusted under 35 U.S.C. 154(b) by 0 days.

(21) Appl. No.: 13/698,362

(22) PCT Filed: May 27, 2010

(86) PCT No.: PCT/CN2010/000754
§ 371 (c)(1),
(2), (4) Date: Jan. 14, 2013

(87) PCT Pub. No.: WO2011/147049
PCT Pub. Date: Dec. 1, 2011

(65) Prior Publication Data
US 2013/0107330 A1    May 2, 2013

(51) Int. Cl.
| H04N 1/04 | (2006.01) |
| H04N 1/03 | (2006.01) |
| H04N 1/031 | (2006.01) |
| H04N 1/191 | (2006.01) |
| H04N 1/12 | (2006.01) |

(52) U.S. Cl.
CPC ............. *H04N 1/03* (2013.01); *H04N 1/0312* (2013.01); *H04N 1/191* (2013.01); *H04N 1/1917* (2013.01); *H04N 1/1918* (2013.01); *H04N 1/12* (2013.01)
USPC ........... 358/482; 358/483; 358/450; 358/496; 358/497; 358/475; 358/484

(58) Field of Classification Search
None
See application file for complete search history.

(56) References Cited

U.S. PATENT DOCUMENTS 4,716,456 A * 12/1987 Hosaka ......................... 358/509
5,081,346 A *  1/1992 Narabu et al. ............. 250/208.1

FOREIGN PATENT DOCUMENTS

| CN | 1264826 A | 8/2000 |
| CN | 101146162 A | 3/2008 |

(Continued)

OTHER PUBLICATIONS

English-language abstract of Japanese Patent No. 59004375A, European Patent Office, Jan. 11, 1984.

(Continued)

*Primary Examiner* — Cheukfan Lee
(74) *Attorney, Agent, or Firm* — DASCENZO Intellectual Property Law, P.C.

(57) ABSTRACT

A document scanner comprises a first image sensor unit (32) and a second image sensor unit (30) and a scanning mechanism (70, 72, 76, 80) for causing relative movement between a document and the units so that the units scan the document in a scanning direction. The first unit (32) is situated ahead of the second unit (30) in the scanning direction and partially overlaps the second unit. Each sensor unit has a respective linear array (44) of electromagnetic radiation detectors and one or more light guides (48, 49) for directing light from a respective one of two imaging lines (63) on to the detectors, wherein, in use, the imaging lines scan the document to capture data representative of two respective sets of scan line portions for combination to obtain a succession of scan lines for the document, the one or more light guides of the first unit (32) are angled rearwardly with respect to the scanning direction, whilst the one or more light guides of the second unit (30) are angled forwardly with respect to the scanning direction, so as to reduce the distance with respect to the scanning direction, between the imaging lines (63).

18 Claims, 2 Drawing Sheets

(56) References Cited

FOREIGN PATENT DOCUMENTS

| CN | 101321224 A | 12/2008 |
| --- | --- | --- |
| CN | 101505356 A | 8/2009 |
| CN | 101510936 A | 8/2009 |
| JP | 59004375 A | 1/1984 |
| JP | 60102611 A | 6/1985 |
| JP | 60121875 A | 6/1985 |
| JP | 1170960 A | 7/1989 |

OTHER PUBLICATIONS

English-language abstract of Japanese Patent No. 60102611A, European Patent Office, Jun. 6, 1985.

English-language abstract of Japanese Patent No. 60121875A, European Patent Office, Jun. 19, 1985.

English-language abstract of Japanese Patent No. 1170960A, European Patent Office, Jul. 6, 1989.

English-language abstract of Chinese Patent No. 1264826A, European Patent Office, Aug. 30, 2000.

English-language abstract of Chinese Patent No. 101146162A, State Intellectual Property Office of the People's Republic of China, Mar. 19, 2008.

English-language abstract of Chinese Patent No. 101321224A, European Patent Office, Aug. 30, 2000.

English-language abstract of Chinese Patent No. 101505356A, European Patent Office, Aug. 30, 2000.

English-language abstract of Chinese Patent No. 101510936A, European Patent Office, Aug. 30, 2000.

\* cited by examiner

DOCUMENT SCANNER

FIELD OF THE INVENTION

This invention relates to document scanners.

BACKGROUND TO THE INVENTION

The invention is particularly applicable to large format document scanners, i.e. those for scanning documents of widths greater than approximately 11 inches (30 centimetres). Typically, a document scanner has an image detection system which obtains image data for a single image line, and a scanning mechanism for causing relative movement between the detection system and a document so as to cause the image line to be swept over the surface of the document. This captures data representative of a succession of scan lines for the document, which can be reconstructed to provide an image of the document.

The image detection system of a document scanner will include an image sensor unit having an array of detectors, for example charge coupled devices (CCDs) or CMOS detectors. In the course of manufacture of the devices, there is a risk of failure of the device which increases with the number of detectors in the array, so that sensor units with arrays of a large number of detectors are more expensive to manufacture than devices which have a smaller number of detectors in their arrays.

Consequently, it is known for large document scanners to use a number of image sensor units, each of which captures data for a respective portion of each scan line. In order to ensure that corresponding portions can be assembled to provide a single continuous scan line, it is known for the ends of neighbouring portions to overlap, so that each portion has a slight overlap with one or two other portions, dependent on whether the portion is from an end or the middle of the scan line.

In a known method of generating image data representative of the entire scan line from the data from a plurality of imaging devices, an initial and/or terminal portion of the image data from each device, corresponding to the slight overlap or overlaps, is discarded and the remainders of the image data are concatenated with one another.

A relatively compact and low cost image sensor unit that can be used as an imaging device is a contact image sensor (CIS). This type of device has a linear array of image detectors, such as charge coupled devices or CMOS devices, covering an area similar to the area of the scan line portion associated with the device. This correspondence between the area of the detectors and the area to be scanned by the device means that bulky and/or expensive optical scaling systems are not needed. However, the need for an overlap between neighbouring scan line portions requires that the contact image sensors are arranged in a physically overlapping relationship in the direction in which the documents are scanned. Because the detectors of the devices have operating circuitry that needs to be positioned adjacent to the detectors, there is a limit to the minimum distance between the adjacent scan line portions in the scanning direction.

This means that the scan line portions must be re-matched in the direction of scanning, either in the electronics of the scanner or in software. Any inconsistencies in the motion of the paper across the CIS units can result in an error in stitching the images from the CTS units together.

SUMMARY OF THE INVENTION

According to the invention, there is provided a document scanner comprising first and second image sensor units and a scanning mechanism for causing relative movement between a document and the units so that the units scan the document in a scanning direction, the first unit being situated ahead of the second unit in the scanning direction, and partially overlapping the second unit, each sensor unit having a respective linear array of electromagnetic radiation detectors and one or more light guides for directing light from a respective one of two imaging lines onto the detectors, wherein, in use, the imaging lines scan the document to capture data representative of two respective sets of scan line portions, for combination to obtain a succession of scan lines for the document, the one or more light guides of the first unit being angled rearwardly with respect of the scanning direction, whilst the one or more light guides of the second unit are angled forwardly with respect to the scanning direction, so as to reduce the distance, in the scanning direction, between the imaging lines.

The reduction in distance between the imaging lines correspondingly lowers the risk of an inconsistency in the scanning motion leading to the wrong scan line portions being combined.

Any reduction in said distance may be beneficial, but preferably the distance is substantially zero, the imaging lines being substantially colinear with a common line which is flanked by the arrays of detectors and which runs perpendicular to the scanning direction, the common line constituting a continuous, composite imaging line.

Preferably, the one or more light guides for each unit comprises a respective linear array of rod lenses, each rod lens directing light from a respective imaging point to a respective detector, the imaging points defining the imaging lines.

The rods may be perpendicular to the detectors, in which case said angling is achieved by angling the first and second image sensor units.

Preferably, however, each rod lens in each array is angled relative to its respective detector.

Preferably, the angle between the two arrays of rod lenses is not more than 10 degrees. Preferably, the arrays of detectors and rod lenses of each sensor unit are offset towards a closer edge of that unit, the units being arranged with their closer edges adjacent to each other.

Thus, the closer edge of the first unit will be the trailing edge in the scanning direction, whilst that of the second unit will be the leading edge.

This enables the desired reduction in distance between imaging lines to be achieved with a small lens angle as the orientation of the units places the array of detectors closer together, in the scanning direction.

Preferably, the first and second sensor units are two of three or more such units arranged in a staggered configuration with alternating orientations so that the closer edge of each unit is adjacent to the closer edge of each neighbouring unit.

The larger number of sensor units enables wider documents to be scanned.

Preferably, each of the image sensor units comprises a respective contact image sensor.

Preferably, the scanner has a common light source, for example a fluorescent tube or array of light emitting diodes, for providing illumination for the images detected by the contact image sensor.

The common light source avoids the need for each contact image sensor to have its own source, and therefore enables the sensors to be of a more compact design than conventional contact image sensors.

In addition, one disadvantage of using known contact image sensors (each of which has its own light source) is that the light source for one of the sensors may emit light of a different colour and/or intensity from the light emitted by the other source. This can lead to linear artefacts in the interface between the portions of the scanned image obtained by the two units. The human eye can be highly sensitive to such artefacts. However, if the units share a common light source, then sharp changes of intensity and/or colour of light at the interface can be avoided.

In that connection, if the source comprises an array of LEDs, it preferably also includes a diffuser for diffusing and mixing the light emitted by individual LEDs. Such a diffuser could, for example, form part of a light guide.

It is within the scope of the invention for the scanning mechanism to move the units through the scanner in the scanning direction to scan a document held stationary thereon, but preferably the units are, in use, stationary with respect to the scanner, the scanning mechanism being operable to move the document past the detectors in the opposite direction to the scanning direction.

BRIEF DESCRIPTION OF THE DRAWINGS

An embodiment of a scanner in accordance with the invention will now be described, by way of example only, and with reference to the accompanying drawings in which.

DETAILED DESCRIPTION

Figure 1:
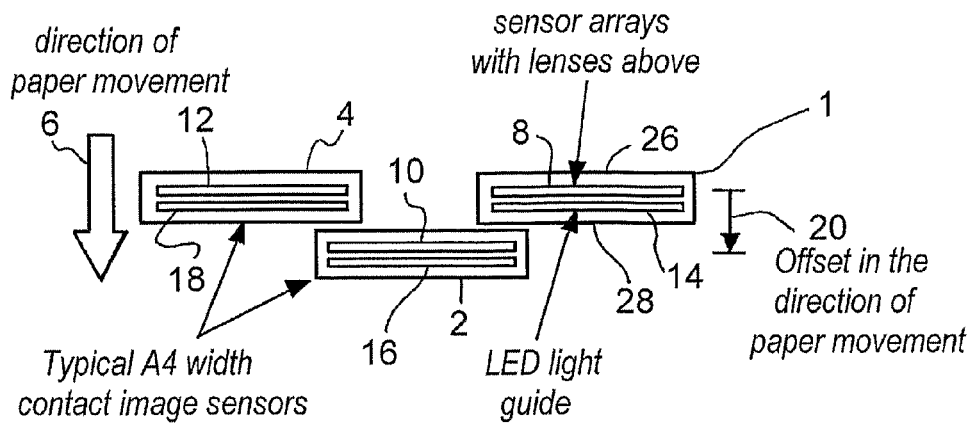
FIG. 1 is a plan view of part of a scanner in accordance with the prior art.

The known large format document scanner of FIG. 1 has first, second and third contact image sensors respectively referenced 1, 2 and 4 which are situated beneath a transparent plate (not shown) over which a document to be scanned is fed in the direction indicated by the arrow 6. The sensors 1, 2 and 4 face upwardly, and each has a linear array of rod lenses that focuses the image of successive scan line portions of the document on an underlying linear array of photo detectors. The lenses of the first sensor 1 are referenced 8, whilst the lenses of the second and third sensors are respectively referenced 10 and 12. Each of the sensors 1, 2 and 4 also have onboard light sources, respectively referenced 14, 16 and 18, each of which illuminates the portion of the document to be imaged by the respective array of sensors. The detectors are arranged with their light sensitive surfaces horizontally orientated, and the rod lenses are vertically orientated.

As can be seen from FIG. 1, the use of more than one sensor enables the width of document that can be scanned to be larger than the length of an individual detector array of any one of the sensors. Each sensor will gather data for a succession of scan line portions of a document being fed through the scanner, the portions then being "stitched" together by computer software to yield a succession of composite scan lines that constitute the image of the scanned document. The direction in which the document is scanned will be opposite that indicated by the arrow 6.

As can be seen from FIG. 1, the lens arrays 8, 10 and 12 do not butt up against the very edges of the sensors, so it is not possible simply to have the sensors arranged side-by-side, otherwise there would be gaps between the adjacent scan line portions. Consequently, the sensors 1, 2 and 4 are arranged in the staggered formation shown in FIG. 1, in which there is some overlap between scan line portions, and in which the first sensor 1 and third sensor 4 are situated ahead of the second sensor 2, in the scanning direction. Consequently, the left and right-hand portions of a given scan line are captured by the sensors 1 and 4 before the central part of the same scan line is captured by the sensor 2. Once the document is passed through the scanner, the scan line portions are analysed by the computer software which identifies the portion of the scan line captured by the sensor 1 that overlaps with that captured by the sensor 2 and discards one of those overlapping parts, and performs the same process in relation to the overlapping parts of the scan line portions captured by the sensors 2 and 4. The software then stitches together the three scan line portions to create a composite scan line for the document. This stitching together has to take into account the delay in the capture of a given portion by the sensor 2 compared with the time of capture of the corresponding portions by the sensors 1 and 4.

Figure 2:
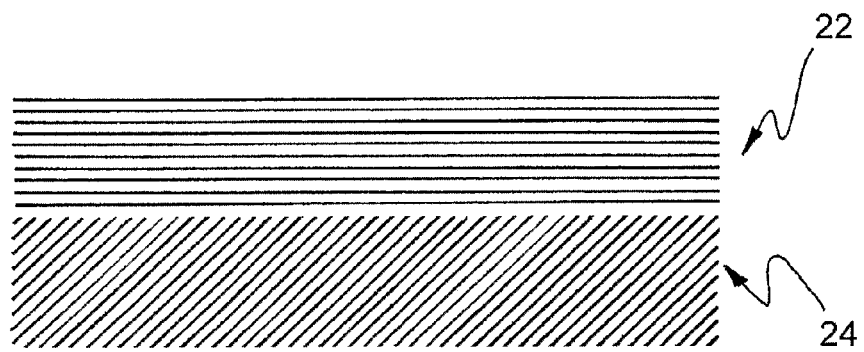
FIG. 2 shows a portion of a document to be scanned by the scanner.
Figure 3:
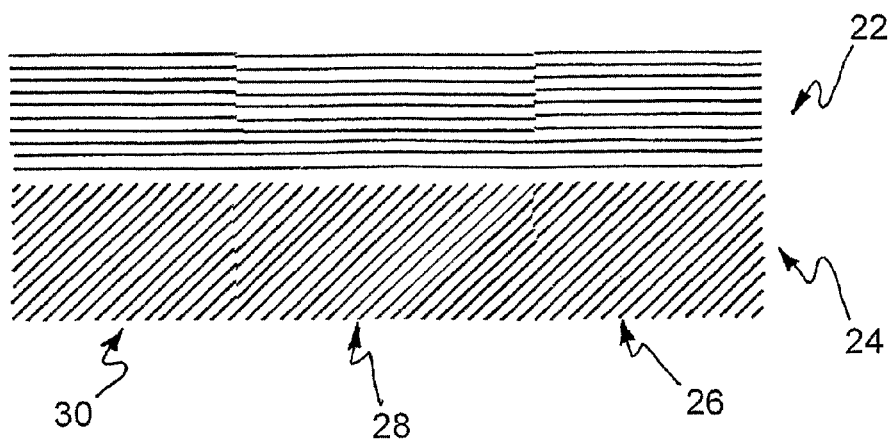
FIG. 3 shows how variations in the rate of feed of documents through the scanner can lead to problems in stitching together the portions of scan lines that constitute the image of the document.

However, this delay cannot properly be taken into account if there is a variation in the movement of the document through the scanner, specifically as the portion of the document to be imaged by a scan line which has been partially captured by the sensors 4 and 8 then traverses the gap, the distance of which is indicated by the arrow 20 in the scanning direction between the lenses 8, 12 and the lenses 10. This can lead stitching errors so that a document having a pattern as shown in FIG. 2, for example yields the erroneous image shown in FIG. 3. As can be seen from FIGS. 2 and 3 the document has a pattern of horizontal lines 22 and diagonal lines 24. In the final document image, references 26, 28 and 30 indicate the portions of image captured by the sensors 1, 2 and 4 respectively. Because of a discontinuity in the feed of the document, the portion 28 is out of register with the portions 26 and 30, so that the horizontal and diagonal lines lose continuity (stitch) periodically at the interfaces between the portions 26, 28 and 30.

The risk of this sort of error occurring increases with the distance indicated by the arrow 20. However, the sensors under the lenses 8, 10 and 12 are mounted on circuit hoards which extend to one side of the lenses and detectors, and under the light sources 14, 16 and 18. This means that the detectors and lenses are offset towards a closer edge of each unit (the edge referenced 26 in FIG. 1), the other edge, the further edge, being indicated by the reference numeral 28. As can be seen from FIG. 1, the sensors 1,2 and 4 all have the same orientation so that the further edge 28 is the edge of the sensor 1 which is adjacent the upper edge of sensor 2. Thus the offset of the detectors and lenses 8 limits the minimum possible distance indicated by the arrow 20.

Figure 4:
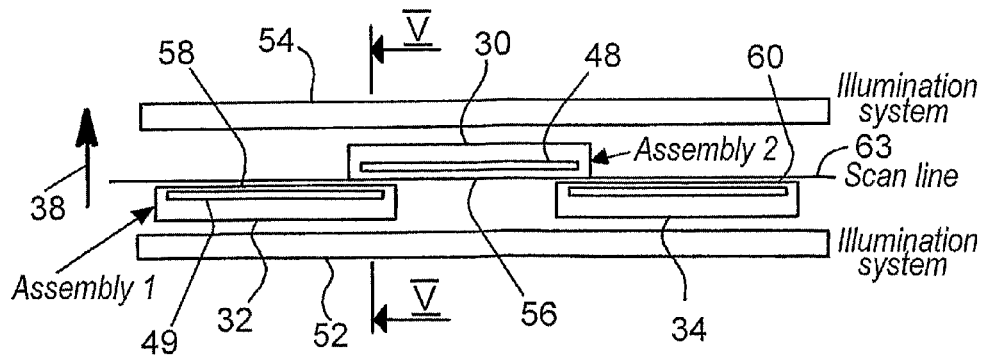
FIG. 4 is a view, corresponding to FIG. 1, of part of the first embodiment of scanner in accordance with the invention.
Figure 5:
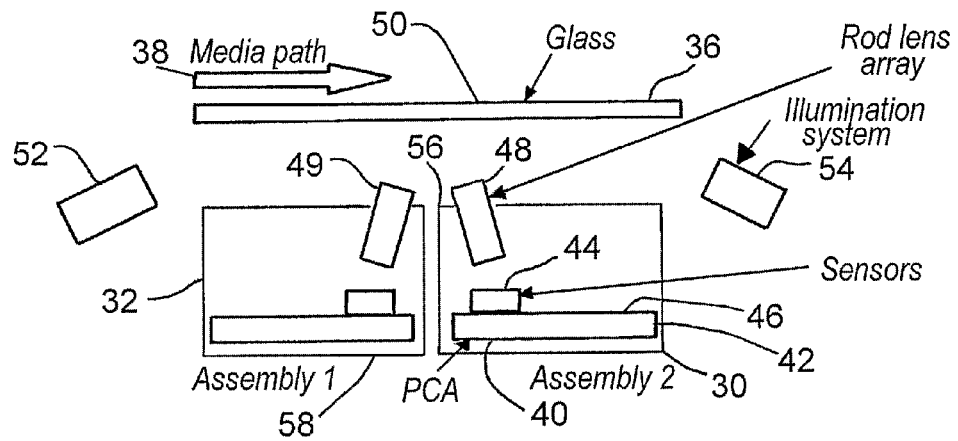
FIG. 5 is a sectional view of the second embodiment along the line V-V of FIG. 4.
Figure 6:
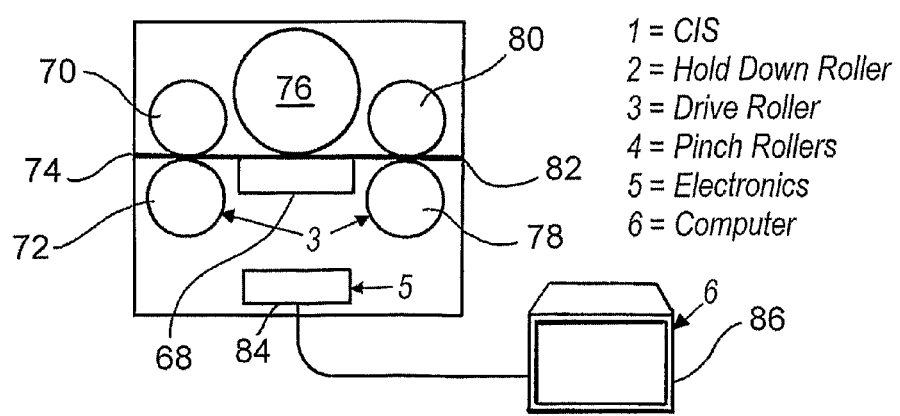
FIG. 6 is a sectional side view of the embodiment of scanner in accordance with the invention.

With reference to FIGS. 4-6, the embodiment of the scanner in accordance with the invention also has a staggered arrangement of three contact scanners, a second sensor 30 flanked by first and third sensors 32 and 34. The three sensors 30, 32 and 34 are held stationary within the scanner underneath a glass plate 36 over which a document can be fed by a scanning mechanism (described below) in the direction indicated by the arrow 38. Thus, the document will be scanned in the direction opposite to that of the arrow 38, so that the first sensor 32 and the third sensor 34 are situated ahead of the second sensor 30 in the scanning direction.

With reference to FIG. 5, the sensor 30 comprises a printed circuit assembly 40 in the form of a printed circuit board 42 on which is mounted a linear array of electromagnetic detectors 44 in the form of a row of CMOS devices for detecting visible light. The circuitry for providing the power to operate the detectors and for enabling the detectors to be interrogated to obtain data representative of the intensity of light incident on each detector is situated on the portion 46 or the printed circuit board 42 to the right-hand side of the array of detectors 44, as viewed in FIG. 5.

The detectors 44 are situated beneath a linear rod lens array 48 constituted by a line of glass rods, each of which is in registry with a respective detector so as to direct light from a respective imaging point, such as the point 50 onto that detector. The size of each detector is substantially the same as the size of the associated imaging point, so that no reduction or magnification of the imaging points has to be performed by the lenses.

The sensors 32 and 34 are of identical construction to the sensor 30, and so are not described in detail. However, the lens array for the sensor 32 is denoted by reference numeral 49.

All three of the sensors are flanked by two common light sources 52 and 54, each of which is of a similar construction to the light sources used by conventional contact image sensors. In the present examples, each of the sources 52 and 54 comprises an arrangement of red, green and blue LEDs within an elongate light guide which conveys light from the LEDs along its length and also diffuses the light to give an even illumination of the light of different colours.

The light sources 52 and 54 provide illumination for each three scan lines of a document detected by the sensors 30, 32 and 34 acting in combination.

As with the contact image sensors of the conventional scanner, the lens arrays of the contact image sensors 30, 32 and 34 are offset towards respective closer edges 56, 58 and 60 of the units. As can be seen from the Figures, the orientation of the sensor 30 is the reverse of that of the sensors 32 and 34, so that the portion 46 of the circuit board 42 is behind the array of detectors 44 in the scanning direction, whereas the corresponding portions of the circuit boards of the detectors 32 and 34 are ahead or the arrays of detectors of those sensors in the scanning direction. The sensors are thus orientated with the closer edges of neighbouring sensors facing each other in the areas where the sensors overlap. The imaging points of each array or detectors constitutes a respective imaging line from which data representative of a succession of scan line portions associated with the sensor is obtained.

The rod lens array 48 for the sensor 30 is angled forwardly with respect to the scanning direction, whilst the rod lens arrays for the sensors 32 and 34 are angled in the opposite direction (i.e. the same direction as the feed direction for a document). The angling is such that, consequently, the three imaging lines associated with the sensors all lie on a common axis, and therefore define a composite imaging line 63.

Typically, the angle between the arrays of rod lenses will be as small as possible (approximately 10 degrees), but is related to the focal distances and thicknesses of the lenses. The maximum permissible angle is only limited by reflection effects of the glass and illumination problems.

The scanner processes and combines the data of the sensors 30, 32 and 34 in a similar way as happens with the prior art scanner, assembling a succession of scan lines for a document from the scan line portions captured by the sensors as the document passes through the scanner. However, since the imaging lines are colinear, the risk of errors in stitching together the portions is reduced, as the portions for each scan line are imaged substantially simultaneously.

FIG. 6 is a sectional side view showing the components of FIGS. 4 and 5 (generally referenced 68) in the scanner. The scanning mechanism of the scanner comprises an upstream drive roller 72 which co-operates with a pinch roller 70 to receive a document fed into an entrance 74 of the scanner. The drive roller 72 propels the document under a hold-down roller 76 which holds the document against the plate 36 to ensure good contact between the document and the glass plate showing the imaging process. A downstream drive roller 78 and associated pinch roller 80 then receive the document and guide and propel it out of an exit 82 of the scanner. The rollers 70, 72, 76, 78 and 80 constitute the scanning mechanism. Data retrieved from the sensors is processed by electronics 84 from which the data is then fed to a computer 86 for constituting the scanned image of the document. It will be appreciated that other arrangements of elements for driving the document through the to scanner in a sufficiently controlled manner may be used as a scanning mechanism.

Each of the contact image sensors (CIS), of either embodiment, may be the size of standard A4 size CIS. The number of sensors provided in the scanner, in a staggered formation, is dependent upon the desired width of scan. Typically, five assemblies arranged in staggered, alternating orientation formation would be required for a scanner to provide a scan width of 40 inches.

It will be understood that other variations may be made to the scanners without departing from the scope of the invention. For example, the two light sources could be replaced by a single light source on one side of the contact image sensors or by a respective on-hoard illumination system on each sensor.

The invention claimed is:

1. A document scanner comprising a first image sensor unit and a second image sensor unit and a scanning mechanism for causing relative movement between a document and the image sensor units so that the image sensor units scan the document in a scanning direction, the first image sensor unit being situated ahead of the second image sensor unit in the scanning direction and partially overlapping the second image sensor unit, each image sensor unit having a respective linear array of electromagnetic radiation detectors and one or more light guides for directing light from a respective one of two imaging lines on to the linear array of electromagnetic radiation detectors, wherein, in use, the imaging lines scan the document to capture data representative of two respective sets of scan line portions for combination to obtain a succession of scan lines for the document, the one or more light guides of the first image sensor unit being angled rearwardly with respect to the scanning direction, whilst the one or more light guides of the second image sensor unit are angled forwardly with respect to the scanning direction, wherein the one or more light guides for each image sensor unit comprises a respective linear array of light guides, each light guide directing light from a respective imaging point to a respective electromagnetic radiation detector, the imaging points defining the imaging lines, and wherein the linear arrays of electromagnetic radiation detectors and the linear arrays of light guides of each image sensor unit are offset towards a closer edge of that image sensor unit, the image sensor units being arranged with the closer edges adjacent to each other.

2. The document scanner according to claim 1 in which the imaging lines are colinear with a common line which is flanked by the linear arrays of electromagnetic radiation detectors and which are perpendicular to the scanning direction, the common line constituting a continuous, composite imaging line.

3. The document scanner according to claim 1, in which each linear array of light guides is angled relative to its respective linear array of electromagnetic radiation detectors.

4. The document scanner according to claim 1, in which an angle between the two linear arrays of light guides is no more than 10 degrees.

5. The document scanner according to claim 1, in which the first and second image sensor units are two of three or more such image sensor units arranged in a staggered configuration with alternating orientations, so that the closer edge of each electromagnetic radiation detector is adjacent to the closer edge of the or each neighbouring image sensor unit.

6. The document scanner according to claim 1, in which each of the image sensor units comprises a respective contact image sensor.

7. The document scanner according to claim 1, in which the document scanner has a common light source for providing illumination for the images detected by the first and second image sensor units.

8. The document scanner according to claim 1, in which the scanning mechanism is operable to move the document past the linear arrays of electromagnetic radiation detectors in an opposite direction to the scanning direction.

9. The document scanner according to claim 1, in which scan line portions partially overlap in the scanning direction.

10. The document scanner according to claim 9, in which the one or more light guides of the first image sensor unit partially overlap, in the scanning direction, the one or more light guides of the second image sensor unit.

11. The document scanner according to claim 9, in which the linear arrays of electromagnetic radiation detectors partially overlap, in the scanning direction.

12. The document scanner according to claim 9, in which the linear array of electromagnetic radiation detectors and the one or more light guides of the first image sensor unit overlap, in the scanning direction, the linear array of electromagnetic radiation detectors and the one or more light guides of the second image sensor unit.

13. A document scanner, comprising:
  a first image sensor unit including a first linear array of electromagnetic radiation detectors and a first linear array of light guides for directing light from a first imaging line on to the first linear array of electromagnetic radiation detectors;
  a second image sensor unit including a second linear array of electromagnetic radiation detectors and a second linear array of light guides for directing light from a second imaging line on to the second linear array of electromagnetic radiation detectors, wherein the second image sensor unit is situated behind the first image sensor unit in a scanning direction and partially overlaps the first image sensor unit; and
  a scanning mechanism for causing relative movement between a document and the first and second image sensor units so that the first and second image sensor units scan the document in the scanning direction;
  wherein the first linear array of electromagnetic radiation detectors partially overlaps the second linear array of electromagnetic radiation detectors in the scanning direction;
  wherein the first linear array of light guides is angled rearwardly with respect to the scanning direction, and wherein the second linear array of light guides is angled forwardly with respect to the scanning direction and partially overlaps, in the scanning direction, the first linear array of light guides; and
  wherein, in use, the first and second imaging lines scan the document to capture data representative of two respective sets of scan line portions for combination to obtain a succession of scan lines for the document, and wherein the scan line portions partially overlap in the scanning direction, and wherein the linear arrays of electromagnetic radiation detectors and the linear arrays of light guides of each image sensor unit are offset towards a closer edge of that image sensor unit, the image sensor units being arranged with the closer edges adjacent to each other.

14. The document scanner according to claim 13, wherein the first and second imaging lines are colinear with a common line which is flanked by the first and second linear arrays of electromagnetic radiation detectors and which is perpendicular to the scanning direction, the common line constituting a continuous, composite imaging line.

15. The document scanner according to claim 13, wherein the first linear array of light guides comprises a linear array of first rod lenses, wherein each first rod lens is configured to direct light from a respective first imaging point to a respective electromagnetic radiation detector of the first linear array of electromagnetic radiation detectors, wherein the second linear array of light guides comprise a linear array of second rod lenses, wherein each second rod lens is configured to direct light from a respective second imaging point to a respective electromagnetic radiation detector of the second linear array of electromagnetic radiation detectors, and wherein the first imaging points define the first imaging line and the second imaging points define the second imaging line.

16. The document scanner according to claim 15, wherein the linear array of first rod lenses is angled relative to the linear array of second rod lenses by no more than 10 degrees.

17. The document scanner according to claim 13, wherein the document scanner has a common light source for providing illumination for the images detected by the first and second image sensor units.

18. A document scanner kit, comprising:
  the document scanner of claim 13; and
  non-transitory computer readable storage media including computer-executable instructions that, when executed, direct a computer to:
    identify portions of the scan lines captured by both the first linear array of electromagnetic radiation detectors and the second linear array of electromagnetic radiation detectors; and
    create a composite scan line for the document.

* * * * *